United States Patent
Takahashi et al.

(10) Patent No.: US 9,417,659 B2
(45) Date of Patent: Aug. 16, 2016

(54) ELECTRONIC APPARATUS

(71) Applicant: Kabushiki Kaisha Toshiba, Tokyo (JP)

(72) Inventors: Issei Takahashi, Ome (JP); Naoki Tani, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 436 days.

(21) Appl. No.: 13/975,899

(22) Filed: Aug. 26, 2013

(65) Prior Publication Data

US 2014/0177143 A1 Jun. 26, 2014

Related U.S. Application Data

(63) Continuation of application No. PCT/JP2013/058103, filed on Mar. 21, 2013.

(30) Foreign Application Priority Data

Dec. 21, 2012 (JP) .................................. 2012-279948

(51) Int. Cl.
*G06F 1/16* (2006.01)
*H04M 1/02* (2006.01)

(52) U.S. Cl.
CPC ............ *G06F 1/1616* (2013.01); *G06F 1/1656* (2013.01); *H04M 1/0249* (2013.01)

(58) Field of Classification Search
CPC .................................................... H04M 1/0249
USPC .................................................... 361/679.02
See application file for complete search history.

(56) References Cited

U.S. PATENT DOCUMENTS

| | | | | | |
|---|---|---|---|---|---|
| 5,574,625 | A | * | 11/1996 | Ohgami | G06F 1/1626 312/223.2 |
| 5,822,192 | A | * | 10/1998 | Hayashi | H05K 5/068 174/50 |
| 6,532,152 | B1 | * | 3/2003 | White | G02F 1/133308 312/223.1 |
| 7,072,624 | B2 | * | 7/2006 | Zheng | H04M 1/0252 361/814 |
| 7,136,291 | B2 | * | 11/2006 | Tu | H01M 2/1066 361/755 |

(Continued)

FOREIGN PATENT DOCUMENTS

| | | |
|---|---|---|
| JP | 10-246211 | 9/1998 |
| JP | 2004-012904 | 1/2004 |

(Continued)

OTHER PUBLICATIONS

Written Opinion and Search Report from corresponding PCT/JP2013/058103 mailed May 28, 2013.

(Continued)

*Primary Examiner* — David Warren
(74) *Attorney, Agent, or Firm* — Rutan & Tucker, LLP; William W. Schaal

(57) ABSTRACT

According to one embodiment, an electronic apparatus includes a first member, a second member, and a supporting member. The second member includes a first portion and a second portion. The first portion is spaced apart from the first member. The second portion inclines in a direction approaching the first member and includes an end adjacent to the first member. The supporting member is attached to an inner surface of the second portion of the second member by an adhesive agent. The supporting member includes a projection contacting with the inner surface of the second portion between the end of the second portion and the adhesive agent.

9 Claims, 9 Drawing Sheets

(56) References Cited

U.S. PATENT DOCUMENTS

2004/0114318 A1* 6/2004 Nuovo .................... H04M 1/23
 361/679.3
2008/0165485 A1* 7/2008 Zadesky .............. H04M 1/0252
 361/679.02

FOREIGN PATENT DOCUMENTS

| JP | 2004-170214 | 6/2004 |
| JP | 2008-009189 | 1/2008 |
| JP | 2012-050110 | 3/2012 |
| WO | 2008/085949 A2 | 7/2008 |

OTHER PUBLICATIONS

Notification of Transmittal of Translation of the International Preliminary Report on Patentability (mailed Jul. 2, 2015) and Written Opinion of the International Searching Authority mailed May 28, 2013 (translation) for International Application No. PCT/JP2013/058103.

English Translation of Written Opinion and Search Report from corresponding PCT/JP2013/058103 mailed May 28, 2013.

* cited by examiner

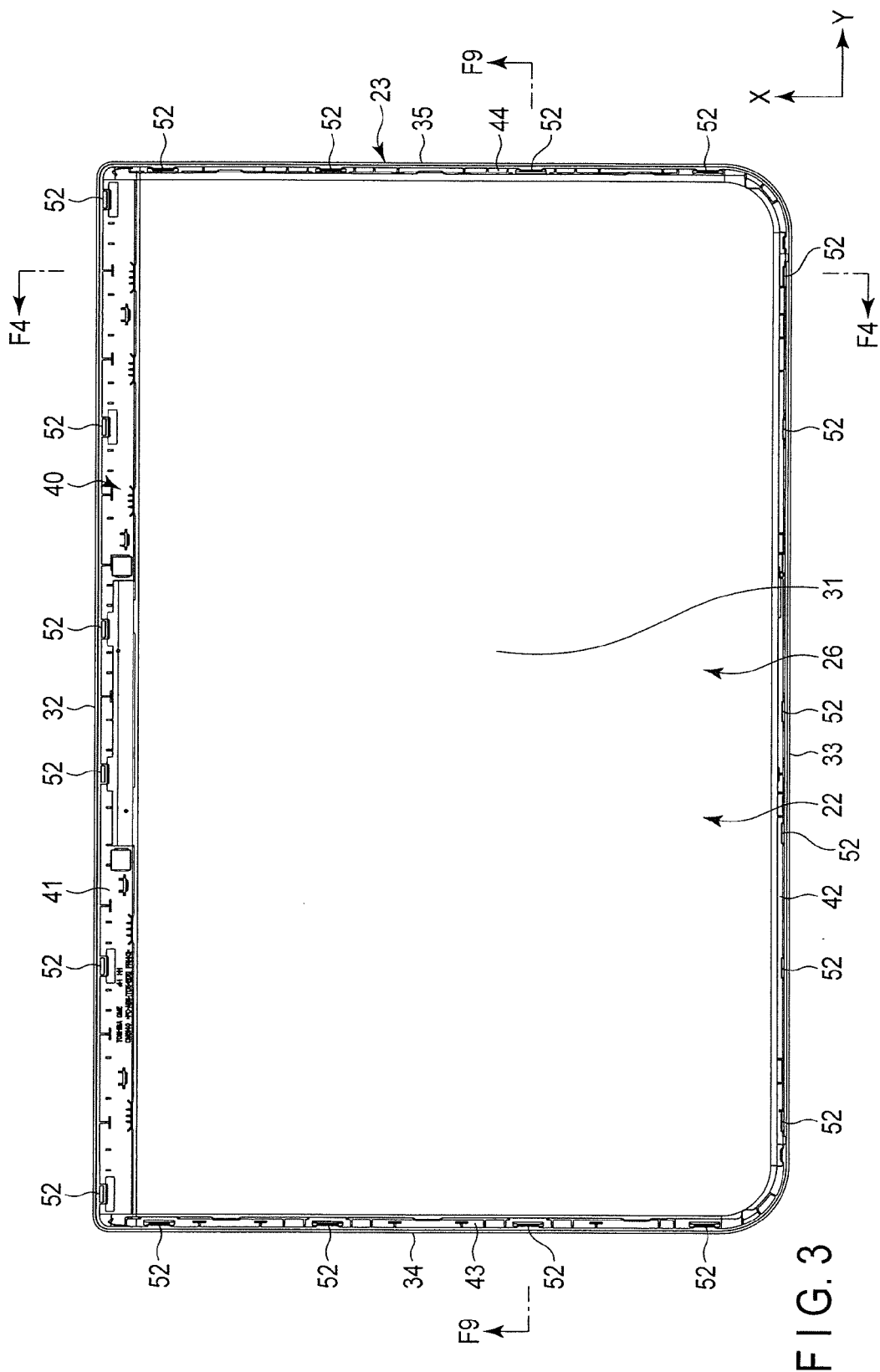
F I G. 3

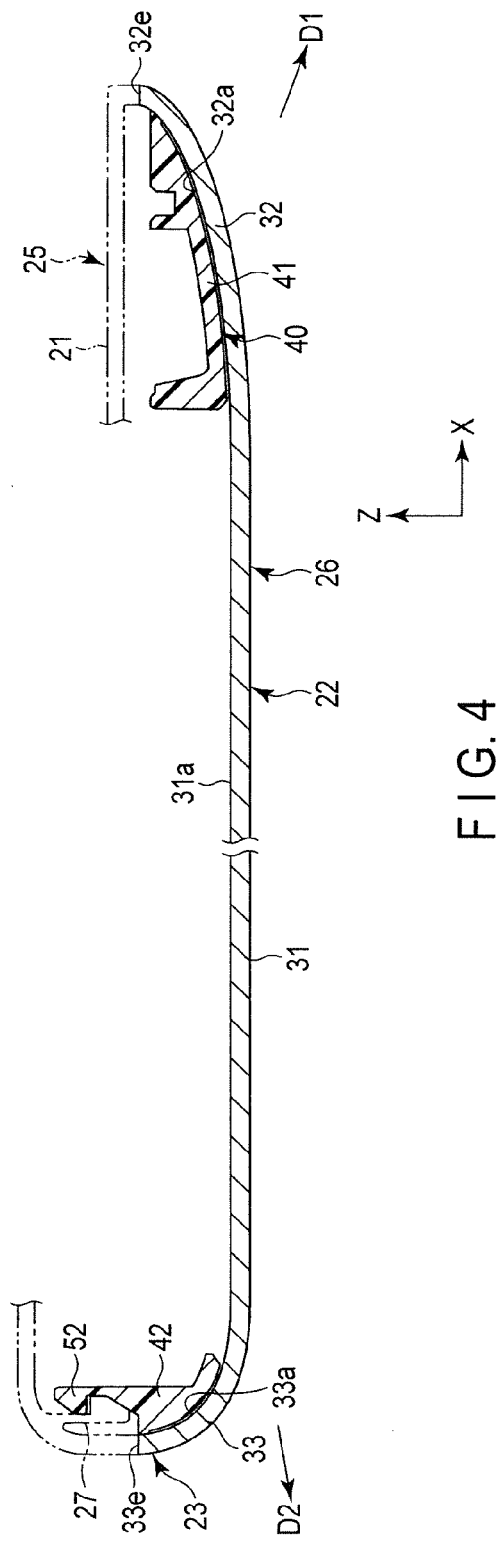
F I G. 4

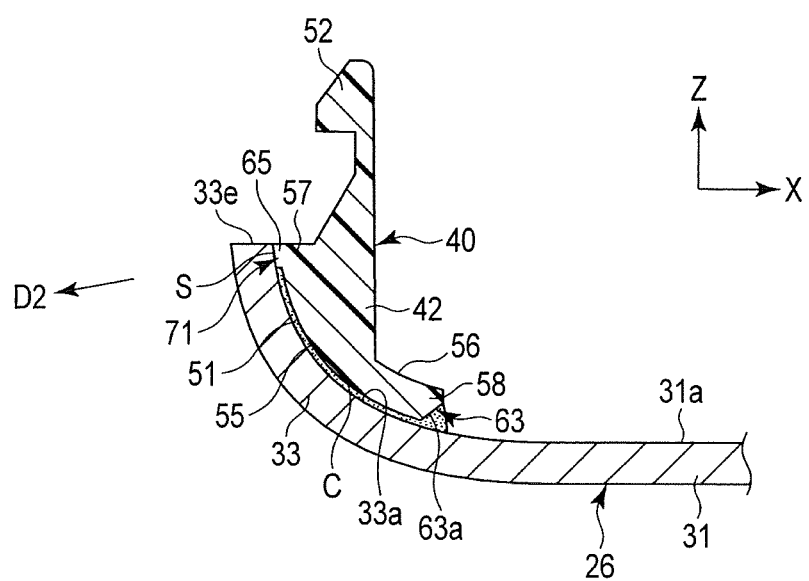
F I G. 8

ELECTRONIC APPARATUS

CROSS REFERENCE TO RELATED APPLICATIONS

This application is a Continuation Application of PCT Application No. PCT/JP2013/058103, filed Mar. 21, 2013 and based upon and claiming the benefit of priority from Japanese Patent Application No. 2012-279948, filed Dec. 21, 2012, the entire contents of all of which are incorporated herein by reference.

FIELD

Embodiments described herein relate generally to electronic apparatuses.

BACKGROUND

A connecting structure in which an escapement hole for an adhesive agent is provided has been proposed.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary plan view of a cover and a supporting member which are shown in FIG. 2.

FIG. 4 is an exemplary cross-sectional view taken along the F4-F4 line of the cover and the supporting member which are shown in FIG. 3.

FIG. 8 is an exemplary cross-sectional view showing a part of the cover and the supporting member which are illustrated in FIG. 4 in an enlarged scale.

DETAILED DESCRIPTION

Various embodiments will be described hereinafter with reference to the accompanying drawings.

In general, according to one embodiment, an electronic apparatus comprises a first member, a second member, and a supporting member. The second member comprises a first portion and a second portion. The first portion is spaced apart from the first member. The second portion inclines in a direction approaching the first member and comprises an end adjacent to the first member. The supporting member is attached to an inner surface of the second portion of the second member by an adhesive agent. The supporting member comprises a projection contacting with the inner surface of the second portion between the end of the second portion and the adhesive agent.

In this specification, some components are expressed by two or more terms. Those terms are just examples. Those components may be further expressed by another or other terms. And the other components which are not expressed by two or more terms may be expressed by another or other terms.

Hereinafter, embodiments are described with reference to the accompanying drawings.

Figure 1:
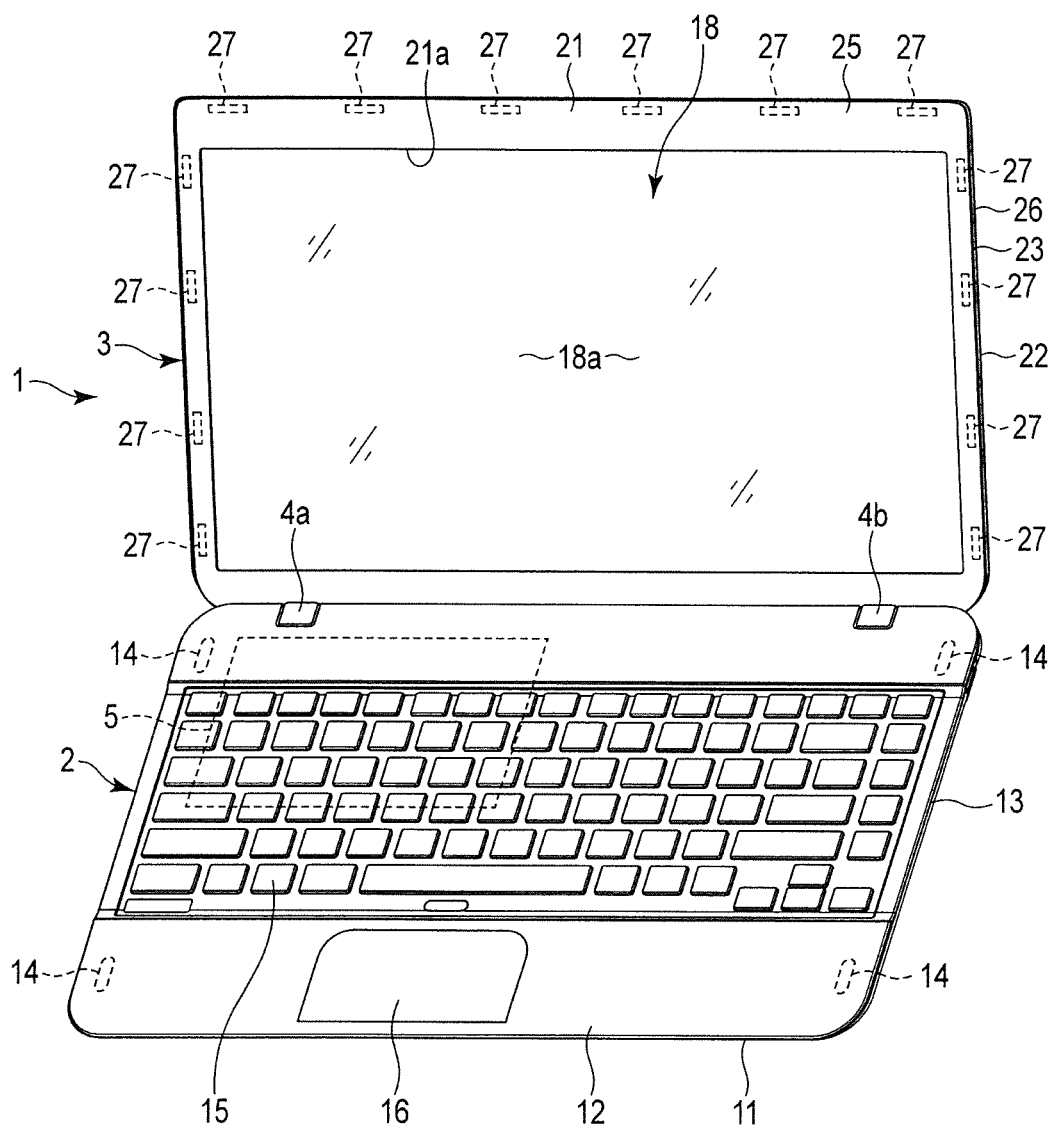
FIG. 1 is an exemplary perspective illustration of an electronic apparatus related to one embodiment.

An electronic apparatus 1 related to one embodiment is explained by reference to FIG. 1 to FIG. 11. As shown in FIG. 1, the electronic apparatus 1 related to the present embodiment is, for example, a notebook type of portable computer. Electronic apparatuses to which the embodiments described herein can be applied are not limited to the above example. The embodiments described herein can be broadly applied to various electronic apparatuses such as a tablet type of portable computer (i.e., tablet terminal), a television, a mobile phone (including a smart phone) and a game machine.

As illustrated in FIG. 1, the electronic apparatus 1 comprises a first housing 2, a second housing 3 and hinges 4a and 4b. The first housing 2 is, for example, a main housing. For example, a circuit board 5 and a battery are housed in the first housing 2.

The first housing 2 comprises a lower wall 11 (i.e., a bottom wall or a first wall), an upper wall 12 (i.e., second wall) and a peripheral wall 13 (i.e., third wall), and is formed in a flat box shape. For example, when the electronic apparatus 1 is placed on a desk, the lower wall 11 faces a desk surface (i.e., a placement surface or an external placement surface). The lower wall 11 comprises, for example, a plurality of legs 14 (i.e., supporting portions). When the electronic apparatus 1 is put on the desk, the legs 14 make contact with the desk surface and support the electronic apparatus 1.

The upper wall 12 is located on a side opposite to the lower wall 11. The upper wall 12 extends, for example, substantially in parallel with the lower wall 11. For example, a keyboard 15 and a click-pad unit 16 are provided in the upper wall 12. Each of the keyboard 15 and the click-pad unit 16 is an example of "input portions (i.e., input receiving portions)". The "input portions (i.e., input receiving portions)" provided in the upper wall 12 are not confined to the above examples. For example, a touch panel (i.e., touch sensor) and other input devices can be employed as the input portions. The peripheral wall 13 extends in a direction intersecting with the lower wall 11 and the upper wall 12, and connects a peripheral portion of the lower wall 11 and a peripheral portion of the upper wall 12.

As shown in FIG. 1, the second housing 3 is, for example, a display housing. In the second housing 3, a display device 18 is accommodated. The display device 18 comprises a display screen 18a. Specifically, the second housing 3 comprises a front wall 21 (i.e., first wall), a rear wall 22 (i.e., a back wall or a second wall) and a peripheral wall 23 (i.e., third wall), and is formed in a flat box shape.

The front wall 21 comprises an opening 21a which is relatively large. From the opening 21a, the display screen 18a of the display device 18 is exposed. The rear wall 22 is located opposite the front wall 21. The rear wall 22 includes a portion which extends substantially in parallel with, for example, the front wall 21. The peripheral wall 23 extends in a direction intersecting with the front wall 21 and the rear wall 22, and connects at least a part of a peripheral portion of the front wall 21 and at least a part of a peripheral portion of the rear wall 22.

The second housing 3 comprises a mask 25 (i.e., a first member or a first cover) and a cover 26 (i.e., a second member or a second cover). The mask 25 includes the front wall 21. The mask 25 may include at least a part of the peripheral wall 23. The cover 26 encompasses the rear wall 22 and at least a part of the peripheral wall 23. The second housing 3 is formed from a combination of the mask 25 and the cover 26. In the following explanation, the second housing 3 is merely described as "housing 3".

FIG. 1 shows that the mask 25 comprises the opening 21a from which the display device 18 is exposed. In the inner surface of the mask 25, a plurality of first engaging portions 27 (i.e., first locking portions or first supporting portions) are provided. The first engaging portions 27 are, for example, claw portions (i.e., first claw portions) having hook-like shapes. However, the first engaging portions 27 are not limited to the specific shape.

Figure 2:
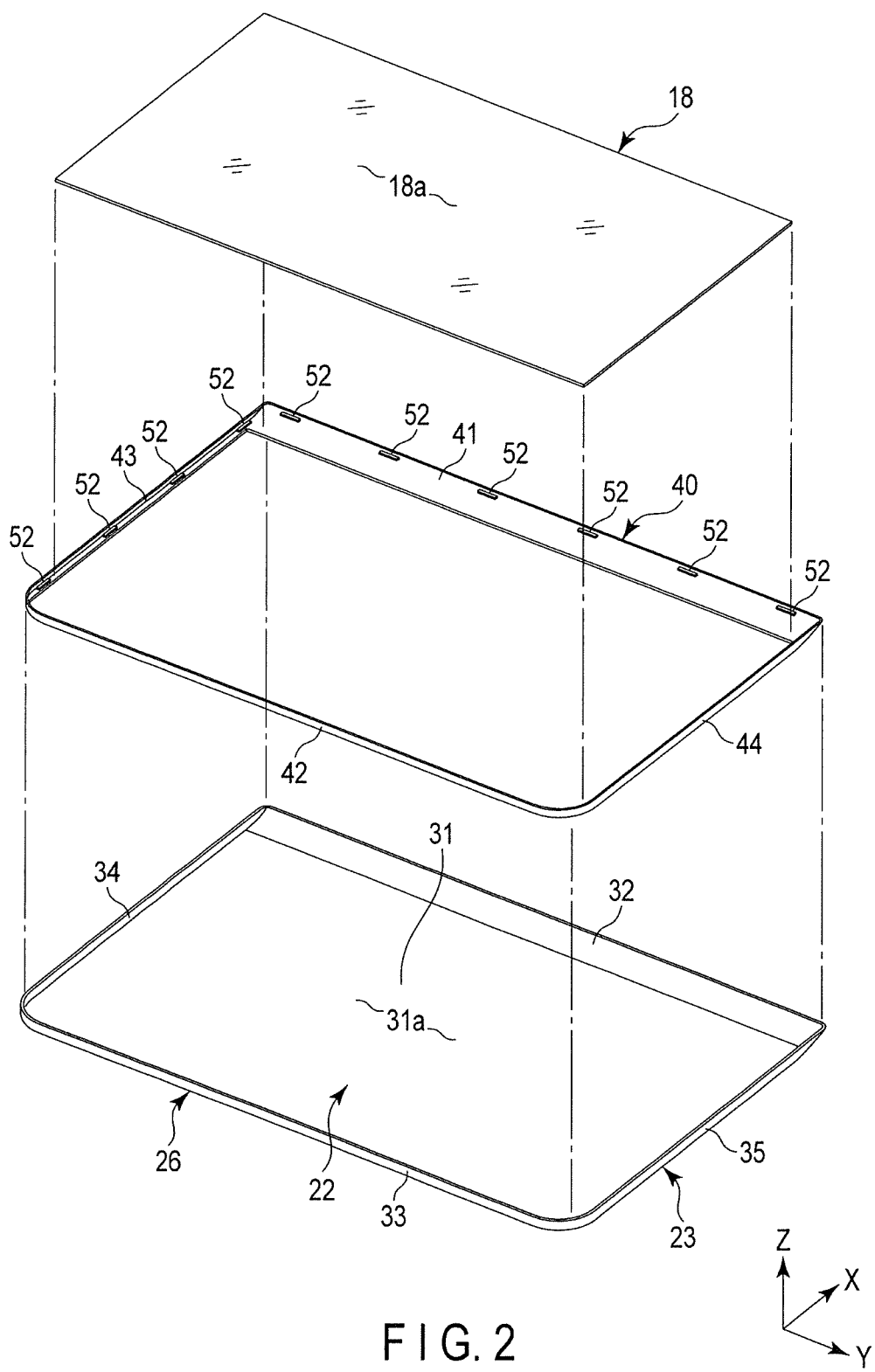
FIG. 2 is an exemplary perspective illustration in which a part of a second housing shown in FIG. 1 is disassembled.

As shown in FIG. 2, the cover 26 of the present embodiment is made from metal (e.g., magnesium alloy), and is, for example, a pressed plate. In other words, the central part of a plane plate is pressed (i.e., hollowed) to form the cover 26 in a thin bowl shape. Therefore, the inner surface of the cover 26 is planar, and does not comprise a projection which engages with each of the first engaging portions 27 of the mask 25. This type of cover 26 is thin and light. Further, the production cost of the cover 26 is low.

Next, the shape of the cover 26 is described in detail by reference to FIG. 2 to FIG. 9.

The cover 26 comprises a first portion 31, a second portion 32, a third portion 33, a fourth portion 34 and a fifth portion 35. The first portion 31 (first wall portion) is, for example, the central part of the cover 26. A gap is left between the first portion 31 and the mask 25. The first portion 31 faces the back surface of the display device 18. This means that the display device 18 is located between the first portion 31 and the mask 25. The first portion 31 extends substantially in parallel with, for example, the mask 25, and is an example of a planar portion (i.e., flat portion).

FIG. 2 illustrates that the second portion 32 (i.e., second wall portion) is located in a first end (e.g., upper end) of the cover 26. As shown in FIG. 4, the second portion 32 extends in a direction crossing the first portion 31. The second portion 32 is an inclined surface portion (e.g., sloping portion) which inclines and extends in a direction approaching the mask 25 from the first portion 31. An end 32e of the second portion 32 is adjacent to the mask 25.

The second portion 32 is a curved surface portion which is formed in a curved surface shape expanding to the outside of the housing 3. The second portion 32 inclines, for example, at a moderate angle (i.e., small curvature) compared with the third to fifth portions 33, 34 and 35 which are described later. The second portion 32 is provided, for example, substantially over the entire length of the first end of the cover 26 (i.e., the entire width of the housing 3).

As indicated in FIG. 2 and FIG. 4, the third portion 33 (i.e., third wall portion) is located on an opposite side to the second portion 32. In other words, the third portion 33 is arranged in a second end (e.g., lower end) of the cover 26. As shown in FIG. 4, the third portion 33 extends in the direction crossing the first portion 31. The third portion 33 is an inclined surface portion (e.g., sloping portion) which inclines and extends in the direction approaching the mask 25 from the first portion 31. An end 33e of the third portion 33 is adjacent to the mask 25.

Furthermore, the third portion 33 is a curved surface portion which is formed in a curved surface shape expanding to the outside of the housing 3. As illustrated in FIG. 3, in the planar view, the third portion 33 extends substantially in parallel with the second portion 32. The third portion 33 is provided, for example, substantially over the entire length of the second end of the cover 26 (i.e., the entire width of the housing 3).

FIG. 2 and FIG. 3 indicate that the fourth portion 34 ranges between the second portion 32 and the third portion 33. The fourth portion 34 is located in a third end (e.g., first side end) of the cover 26. The fourth portion 34 extends in the direction crossing the first portion 31 (refer to FIG. 9). The fourth portion 34 is an inclined surface portion (e.g., sloping portion) which inclines and extends in the direction approaching the mask 25 from the first portion 31. An end 34e of the fourth portion 34 is adjacent to the mask 25.

The fourth portion 34 is a curved surface portion which is formed in a curved surface shape expanding to the outside of the housing 3. As shown in FIG. 3, in the planar view, the fourth portion 34 extends in a direction substantially perpendicular to the second portion 32 and the third portion 33. The fourth portion 34 is provided, for example, substantially over the entire length of the third end of the cover 26.

As illustrated in FIG. 2 and FIG. 3, the fifth portion 35 ranges between the second portion 32 and the third portion 33. The fifth portion 35 is located on a side opposite to the fourth portion 34. The fifth portion 35 is arranged in a fourth end (e.g., second side end) of the cover 26. The fifth portion 35 extends in the direction intersecting with the first portion 31 (refer to FIG. 9). The fifth portion 35 is an inclined surface portion (e.g., sloping portion) which inclines and extends in the direction approaching the mask 25 from the first portion 31. An end 35e of the fifth portion 35 is adjacent to the mask 25.

The fifth portion 35 is a curved surface portion which is formed in a curved surface shape expanding to the outside of the housing 3. As shown in FIG. 3, in the planar view, the fifth portion 35 extends substantially in parallel with the fourth portion 34. The fifth portion 35 is provided, for example, substantially over the entire length of the fourth end of the cover 26.

As shown in FIG. 2, a supporting member 40 (i.e., a retaining member, an attachment member, or a frame) is attached to the inner surface of the cover 26. The supporting member 40 is a component which is a different piece from the cover 26. For example, the supporting member 40 is a molded component made from synthetic resin. By attaching the supporting member 40, for example, engaging structures which engage with the first engaging portions 27 of the mask 25 and a supporting structure of a cable are provided in the inner surface of the flat cover 26.

Next, the shape of the supporting member 40 is described in detail with reference to FIG. 2 to FIG. 9.

FIG. 2 and FIG. 3 show that the supporting member 40 is a frame shape along the outline (outer circumferential frame) of the cover 26. The supporting member 40 comprises, for example, first to fourth portions 41, 42, 43 and 44 (i.e., four side portions or four linear portions). The first to fourth portions 41, 42, 43 and 44 correspond to the first to fourth ends of the cover 26 respectively. The first to fourth portions 41, 42, 43 and 44 are, for example, shaped as one unit, and connected with each other. In short, the supporting member 40 is a molded component which is integrally molded.

As indicated in FIG. 2 to FIG. 4, the first portion 41 faces the second portion 32 of the cover 26. The first portion 41 extends along the first end of the cover 26, and for example, ranges substantially over the entire length of the first end of the cover 26. The first portion 41 is fixed to an inner surface 32a of the second portion 32 of the cover 26 by an adhesive agent 51. The first portion 41 comprises a plurality of second engaging portions 52 (i.e., second locking portions or second supporting portions) which engage with the first engaging portions 27. The second engaging portions 52 are, for example, claw portions (i.e., second claw portions) having hook-like shapes. However, the second engaging portions 52 are not limited to the specific shape.

Figure 5:
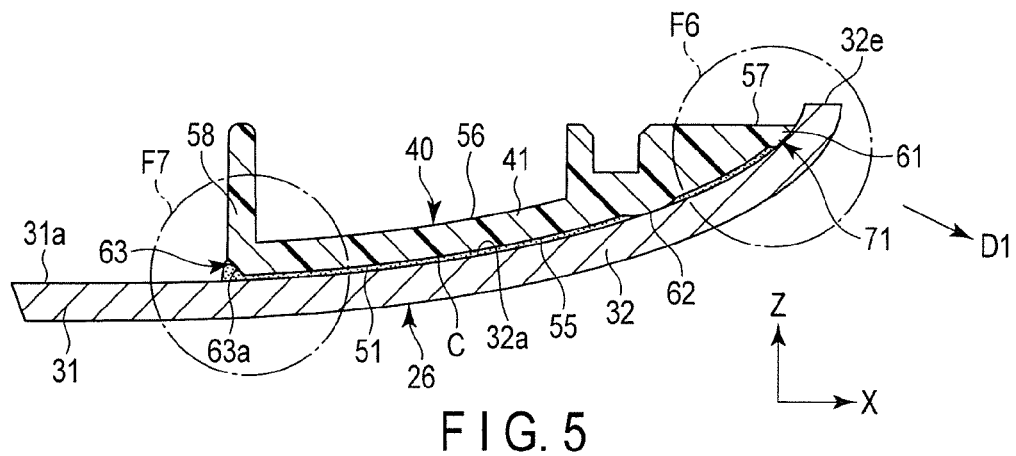
FIG. 5 is an exemplary cross-sectional view showing a part of the cover and the supporting member which are illustrated in FIG. 4 in an enlarged scale.

FIG. 5 illustrates that the first portion 41 comprises a first surface 55 and a second surface 56. The first surface 55 (i.e., adhesion surface) faces the inner surface of the cover 26. The second surface 56 is located on a side opposite to the first surface 55. The second surface 56 is exposed to the inside of the housing 3.

As shown in FIG. 5, the first surface 55 of the first portion 41 is a curved surface shape along the inner surface 32a of the second portion 32 of the cover 26. There is a narrow gap C (e.g., a gap of 0.1 mm) between the first surface 55 of the first portion 41 and the inner surface 32a of the second portion 32 of the cover 26. The adhesive agent 51 is positioned in the gap C, and bonds the first surface 55 of the first portion 41 and the inner surface 32a of the second portion 32 of the cover 26 together.

As illustrated in FIG. 5, the first portion 41 comprises a first end 57 (e.g., first edge) and a second end 58 (e.g., second edge). The first end 57 is the outer end of the first portion 41, and is located in the outer circumferential frame of the supporting member 40. The second end 58 is located opposite the first end 57. The second end 58 is the inner end of the first portion 41, and is positioned in the inner circumferential frame of the supporting member 40.

Figure 6:
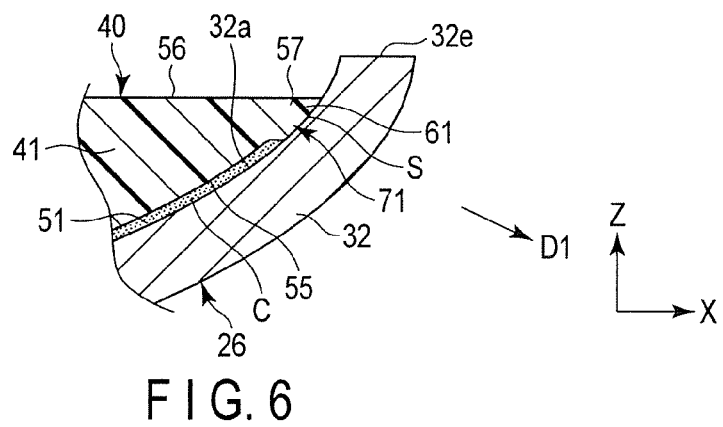
FIG. 6 is an exemplary cross-sectional view showing a portion surrounded by the F6 line of the cover and the supporting member which are illustrated in FIG. 5 in an enlarged scale.

FIG. 6 shows that a first projection 61 is provided in the first end 57 of the first portion 41. The first projection 61 projects toward the inner surface 32a of the second portion 32 of the cover 26 from the first surface 55 of the first portion 41.

The first projection 61 is located between the end 32e of the second portion 32 adjacent to the mask 25 and the adhesive agent 51. The first projection 61 comes in contact with the inner surface 32a of the second portion 32 of the cover 26, and linearly extends along the end 32e of the second portion 32. The first projection 61 forms a wall which restricts the adhesive agent 51 from leaking out.

An X direction, a Y direction and a Z direction are defined as shown in FIG. 2. The X direction and the Y direction are directions substantially parallel with the display screen 18a (i.e., directions substantially parallel with an inner surface 31a of the first portion 31). The X direction is, for example, a direction going from the third portion 33 of the cover 26 to the second portion 32 of the cover 26. The Y direction and the X direction cross each other (e.g., the Y and X directions are substantially orthogonal to each other). The Y direction is, for example, a direction going from the fourth portion 34 of the cover 26 to the fifth portion 35 of the cover 26. The Z direction is a direction crossing the X direction and the Y direction (e.g., the Z direction is a direction substantially orthogonal to the X and Y directions). The Z direction is, for example, a thickness direction of the display device 18 (i.e., a thinness direction of the housing 3, a direction crossing (e.g., substantially orthogonal to) the inner surface 31a of the first portion 31).

As shown in FIG. 6, the distal end of the first projection 61 has an inclined surface S which inclines with respect to the first portion 31 of the cover 26. The first projection 61 comes in contact with the inner surface 32a of the second portion 32 of the cover 26 in the X direction, and at the same time, it comes in contact with the inner surface 32a of the second portion 32 of the cover 26 in the Z direction. Therefore, the locations of the X and Z directions of the supporting member 40 are determined by the contact of the first projection 61 with the inner surface 32a of the second portion 32 of the cover 26.

Moreover, FIG. 5 shows that the first surface 55 of the first portion 41 comprises, for example, another projection 62 for location determination. The projection 62 has, for example, a distal end whose shape is a spherical surface (i.e., curved surface), and comes in contact with the inner surface of the cover 26. Similarly to the first projection 61, the projection 62 comes in contact with the inner surface 32a of the second portion 32 of the cover 26 in each of the X direction and the Z direction. The adhesive agent 51 is not applied to the surface of the first projection 61 or of the other projection 62.

On the other hand, as illustrated in FIG. 5, an accumulation portion 63 is provided in the second end 58 of the first portion 41. The accumulation portion 63 is, for example, a cut-out (or groove) provided at a corner of the second end 58 of the first portion 41. The accumulation portion 63 is provided, for example, along the first end of the cover 26 substantially over the entire length of the first end (i.e., the entire width of the housing 3).

Figure 7:
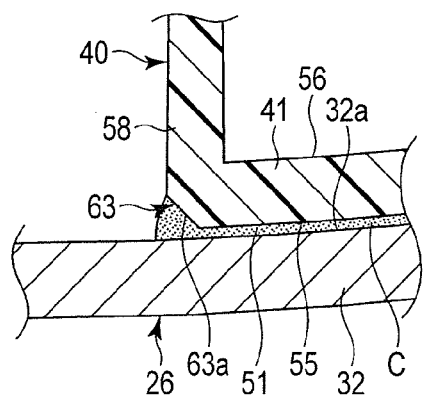
FIG. 7 is an exemplary cross-sectional view showing a portion surrounded by the F7 line of the cover and the supporting member which are illustrated in FIG. 5 in an enlarged scale.

FIG. 7 indicates that the accumulation portion 63 comprises a surface 63a which inclines in a direction away from the inner surface of the cover 26. Therefore, the accumulation portion 63 creates a large gap with respect to the inner surface of the cover 26 compared with the other regions. When the supporting member 40 is attached to the cover 26, the accumulation portion 63 can accommodate a part of the adhesive agent 51 which is sandwiched between the first surface 55 of the supporting member 40 and the inner surface of the cover 26 and transfers toward the inside of the supporting member 40.

As shown in FIG. 7, the surface 63a of the accumulation portion 63 faces the inner surface of the cover 26 in the Z direction. The space between the surface 63a of the accumulation portion 63 and the inner surface of the cover 26 is filled with the adhesive agent 51 to bond the surface 63a of the accumulation portion 63 and the inner surface of the cover 26 together.

Next, the second portion 42 is explained in detail referring to FIG. 4 and FIG. 8. The explanations of the structures which have the same functions as or similar functions to the structures of the first portion 41 are omitted using the same reference symbols.

The second portion 42 faces the third portion 33 of the cover 26. The second portion 42 extends along the second end of the cover 26, and for example, ranges substantially over the entire length of the second end of the cover 26. The second portion 42 is fixed to an inner surface 33a of the third portion 33 of the cover 26 by the adhesive agent 51. In the second portion 42, the plurality of second engaging portions 52 (i.e., second locking portions or second supporting portions) which engage with the first engaging portions 27 are provided.

FIG. 8 indicates that the first surface 55 of the second portion 42 is a curved surface shape along the inner surface 33a of the third portion 33 of the cover 26. Between the first surface 55 of the second portion 42 and the inner surface 33a of the third portion 33 of the cover 26, there is the gap C. The adhesive agent 51 is provided in the gap C between the first surface 55 of the second portion 42 and the inner surface 33a of the third portion 33 of the cover 26 to bond the second portion 42 and the third portion 33 of the cover 26 together.

As shown in FIG. 8, the first end 57 of the second portion 42 comprises a second projection 65. The second projection 65 protrudes from the first surface 55 of the second portion 42 toward the inner surface 33a of the third portion 33 of the cover 26.

The second projection 65 is located between the end 33e of the third portion 33 adjacent to the mask 25 and the adhesive agent 51. The second projection 65 comes in contact with the inner surface 33a of the third portion 33 of the cover 26, and linearly extends along the end 33e of the third portion 33.

As illustrated in FIG. 8, the second projection 65 comes in contact with the inner surface 33a of the third portion 33 of the cover 26 in the X direction, and at the same time, it comes in contact with the inner surface 33a of the third portion 33 of the cover 26 in the Z direction. Thus, the locations of the X and Z directions of the supporting member 40 are determined by the contact of the second projection 65 with the inner surface 33a of the third portion 33 of the cover 26.

Looked in a different viewpoint, the first projection 61 comes in contact with the inner surface 32a of the second portion 32 of the cover 26 in a first direction D1. The second projection 65 comes in contact with the inner surface 33a of the third portion 33 of the cover 26 in a second direction D2 which is different from the first direction D1. The first direction D1 and the second direction D2 are directions substantially orthogonal to the inner surface 32a of the second portion 32 of the cover 26 and the inner surface 33a of the third portion 33 of the cover 26. The first direction D1 and the second direction D2 include directional elements of opposite directions to each other, thereby determining the location of the X direction of the supporting member 40.

On the other hand, the second end 58 of the second portion 42 comprises the accumulation portion 63. The accumulation portion 63 is provided, for example, along the second end of the cover 26 substantially over the entire length of the second end (i.e., the entire width of the housing 3).

Next, the details of the third portion 43 are explained by reference to FIG. 9. The structures having the same functions as or similar functions to the structures of the first portion 41 are denoted by the same reference symbols. Thus, the explanations of such structures are omitted.

The third portion 43 faces the fourth portion 34 of the cover 26. The third portion 43 extends along the third end of the cover 26, and for example, ranges substantially over the entire length of the third end of the cover 26. The third portion 43 is fixed to an inner surface 34a of the fourth portion 34 of the cover 26 by the adhesive agent 51. The third portion 43 comprises the plurality of second engaging portions 52 (i.e., second locking portions or second supporting portions) which engage with the first engaging portions 27.

Figure 9:
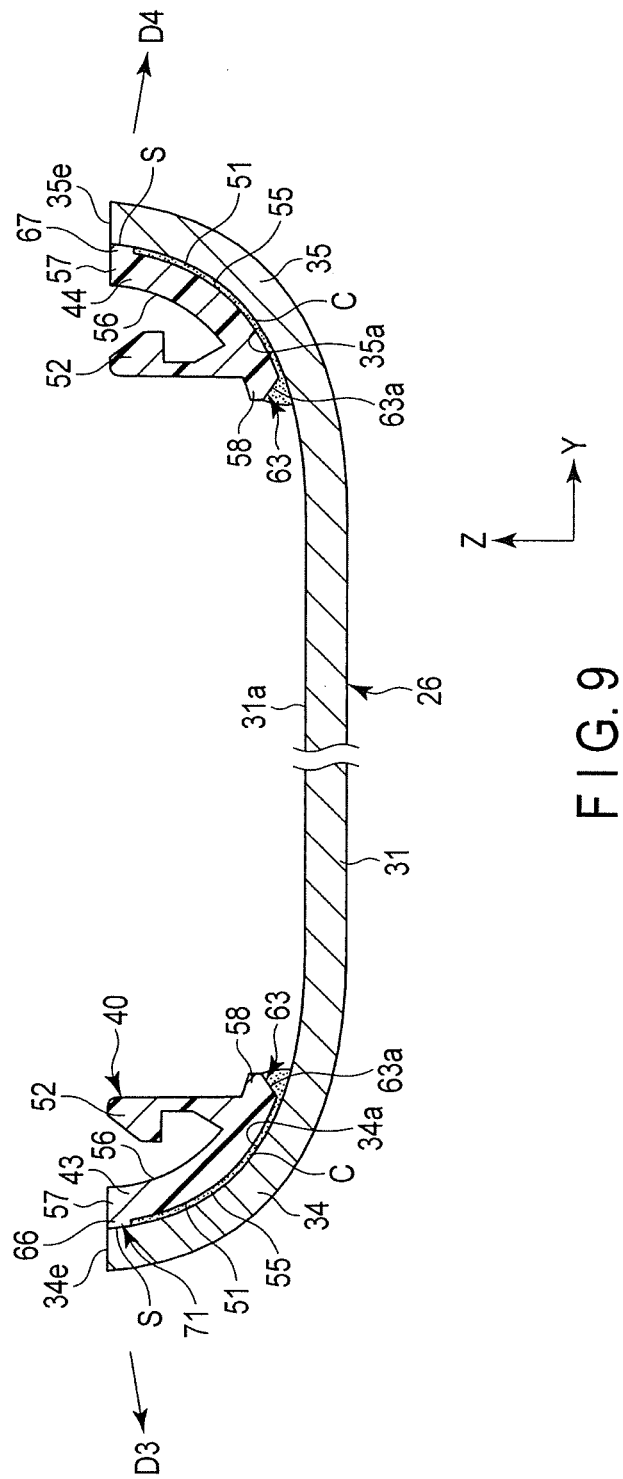
FIG. 9 is an exemplary cross-sectional view taken along the F9-F9 line of the cover and the supporting member which are shown in FIG. 3.

FIG. 9 illustrates that the first surface 55 of the third portion 43 is a curved surface shape along the inner surface 34a of the fourth portion 34 of the cover 26. The adhesive agent 51 is located in the gap C between the first surface 55 of the third portion 43 and the inner surface 34a of the fourth portion 34 of the cover 26 to bond the third portion 43 and the fourth portion 34 of the cover 26 together.

As indicated in FIG. 9, a third projection 66 is provided in the first end 57 of the third portion 43. The third projection 66 protrudes from the first surface 55 of the third portion 43 toward the inner surface 34a of the fourth portion 34 of the cover 26.

The third projection 66 is located between the end 34e of the fourth portion 34 adjacent to the mask 25 and the adhesive agent 51. The third projection 66 comes in contact with the inner surface 34a of the fourth portion 34 of the cover 26, and linearly extends along the end 34e of the fourth portion 34.

As shown in FIG. 9, the third projection 66 comes in contact with the inner surface 34a of the fourth portion 34 of the cover 26 in the Y direction, and at the same time, it comes in contact with the inner surface 34a of the fourth portion 34 of the cover 26 in the Z direction. Therefore, by the contact of the third projection 66 with the inner surface 34a of the fourth portion 34 of the cover 26, the locations of the Y and Z directions of the supporting member 40 are determined.

On the other hand, the second end 58 of the third portion 43 comprises the accumulation portion 63. The accumulation portion 63 is provided, for example, along the third end of the cover 26 substantially over the entire length of the third end.

Next, the details of the fourth portion 44 are explained by reference to FIG. 9. The structures having the same functions as or similar functions to the structures of the first portion 41 are denoted by the same reference symbols. Thus, the explanations of such structures are omitted.

The fourth portion 44 faces the fifth portion 35 of the cover 26. The fourth portion 44 extends along the fourth end of the cover 26, and for example, ranges substantially over the entire length of the fourth end of the cover 26. The fourth portion 44 is fixed to an inner surface 35a of the fifth portion 35 of the cover 26 by the adhesive agent 51. In the fourth portion 44, the plurality of second engaging portions 52 (i.e., second locking portions or second supporting portions) which engage with the first engaging portions 27 are provided.

As shown in FIG. 9, the first surface 55 of the fourth portion 44 is a curved surface shape along the inner surface 35a of the fifth portion 35 of the cover 26. The adhesive agent 51 is provided in the gap C between the first surface 55 of the fourth portion 44 and the inner surface 35a of the fifth portion 35 of the cover 26 to bond the fourth portion 44 and the fifth portion 35 of the cover 26 together.

FIG. 9 illustrates that the first end 57 of the fourth portion 44 comprises a fourth projection 67. The fourth projection 67 protrudes from the first surface 55 of the fourth portion 44 toward the inner surface 35a of the fifth portion 35 of the cover 26.

The fourth projection 67 is located between the end 35e of the fifth portion 35 adjacent to the mask 25 and the adhesive agent 51. The fourth projection 67 comes in contact with the inner surface 35a of the fifth portion 35 of the cover 26, and extends in a linear fashion along the end 35e of the fifth portion 35.

As indicated in FIG. 9, the fourth projection 67 comes in contact with the inner surface 35a of the fifth portion 35 of the cover 26 in the Y direction, and at the same time, it comes in contact with the inner surface 35a of the fifth portion 35 of the cover 26 in the Z direction. Therefore, the locations of the Y and Z directions of the supporting member 40 are determined by the contact of the fourth projection 67 with the inner surface 35a of the fifth portion 35 of the cover 26.

Viewed from a different perspective, the third projection 66 comes in contact with the inner surface 34a of the fourth portion 34 of the cover 26 in a third direction D3. The fourth projection 67 comes in contact with the inner surface 35a of the fifth portion 35 of the cover 26 in a fourth direction D4 which is different from the third direction D3. The third direction D3 and the fourth direction D4 are, for example, directions substantially orthogonal to the inner surface 34a of the fourth portion 34 of the cover 26 and the inner surface 35a of the fifth portion 35 of the cover 26. The third direction D3 and the fourth direction D4 include directional elements of opposite directions to each other, thereby determining the location of the Y direction of the supporting member 40.

On the other hand, in the second end 58 of the fourth portion 44, the accumulation portion 63 is provided. The accumulation portion 63 is provided, for example, along the fourth end of the cover 26 substantially over the entire length of the fourth end.

Figure 10:
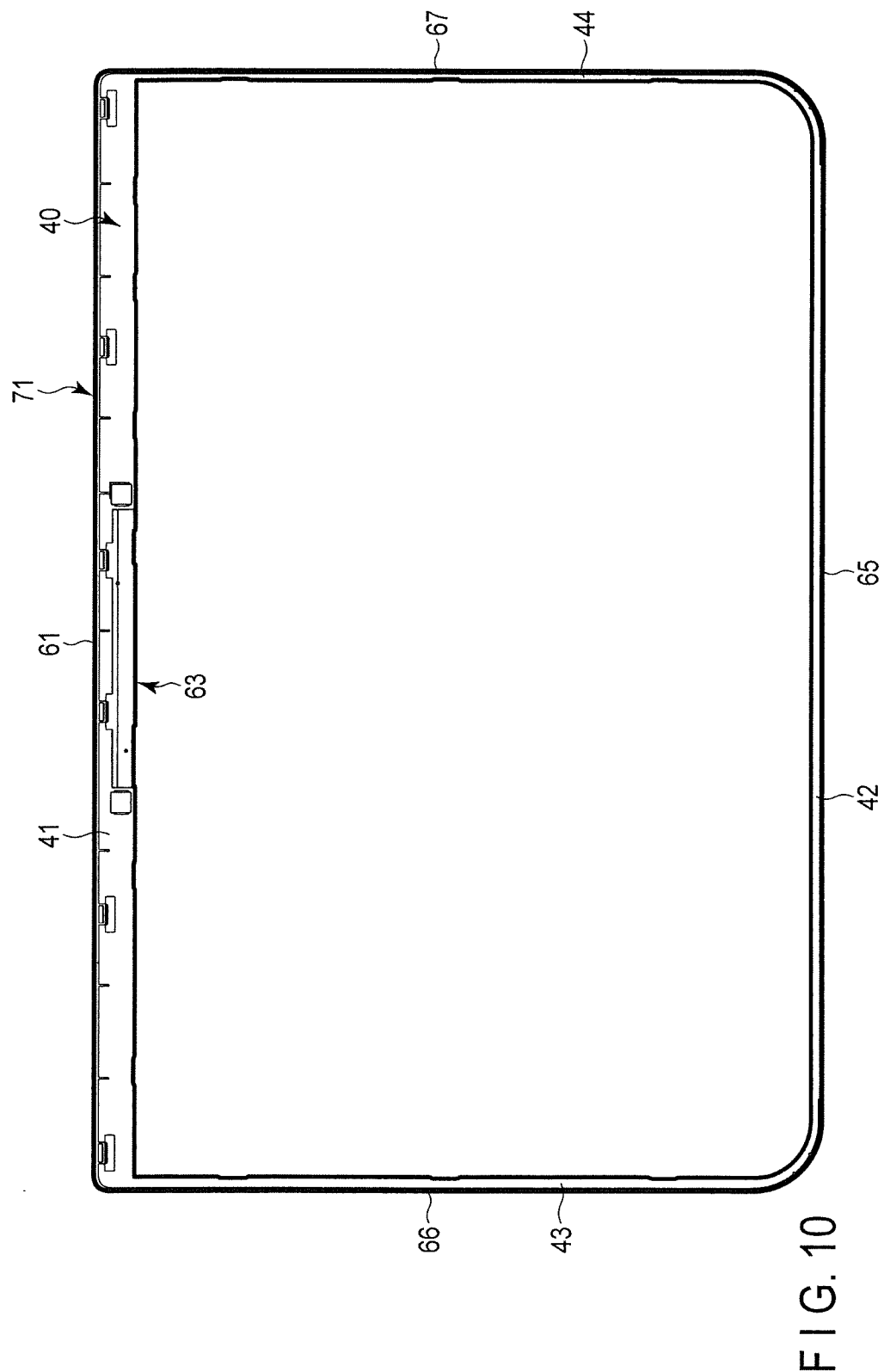
FIG. 10 is an exemplary plan view schematically showing the supporting member illustrated in FIG. 2.

FIG. 10 schematically shows the positions of the first to fourth projections 61, 65, 66 and 67 and the accumulation portion 63 by using thick lines. FIG. 10 illustrates that a rib 71 including the first to fourth projections 61, 65, 66 and 67 is provided in the outer circumferential frame of the supporting member 40. In other words, the first to fourth projections 61, 65, 66 and 67 are connected with each other to form the rib 71 having a frame shape along the outer circumferential frame of the supporting member 40. The rib 71 is provided, for example, substantially in the whole circumference of the outer circumferential frame of the supporting member 40. However, the rib 71 may not be continuous all the way through. This means that a portion in which the rib 71 is not provided can exist in a part of the outer circumferential frame of the supporting member 40.

As shown in FIG. 10, the accumulation portions 63 provided in the first to fourth portions 41, 42, 43 and 44 of the supporting member 40 respectively are connected with each other to form the frame-like accumulation portions 63 along the inner circumferential frame of the supporting member 40. In other words, the accumulation portions 63 extend along the inner circumferential frame of the supporting member 40. The accumulation portions 63 are provided, for example, substantially in the entire circumference of the inner circumferential frame of the supporting member 40. The accumulation portions 61 may not be continuous all the way through. This means that a portion in which the accumulation portion 63 is not provided can exist in a part of the inner circumferential frame of the supporting member 40.

Figure 11:
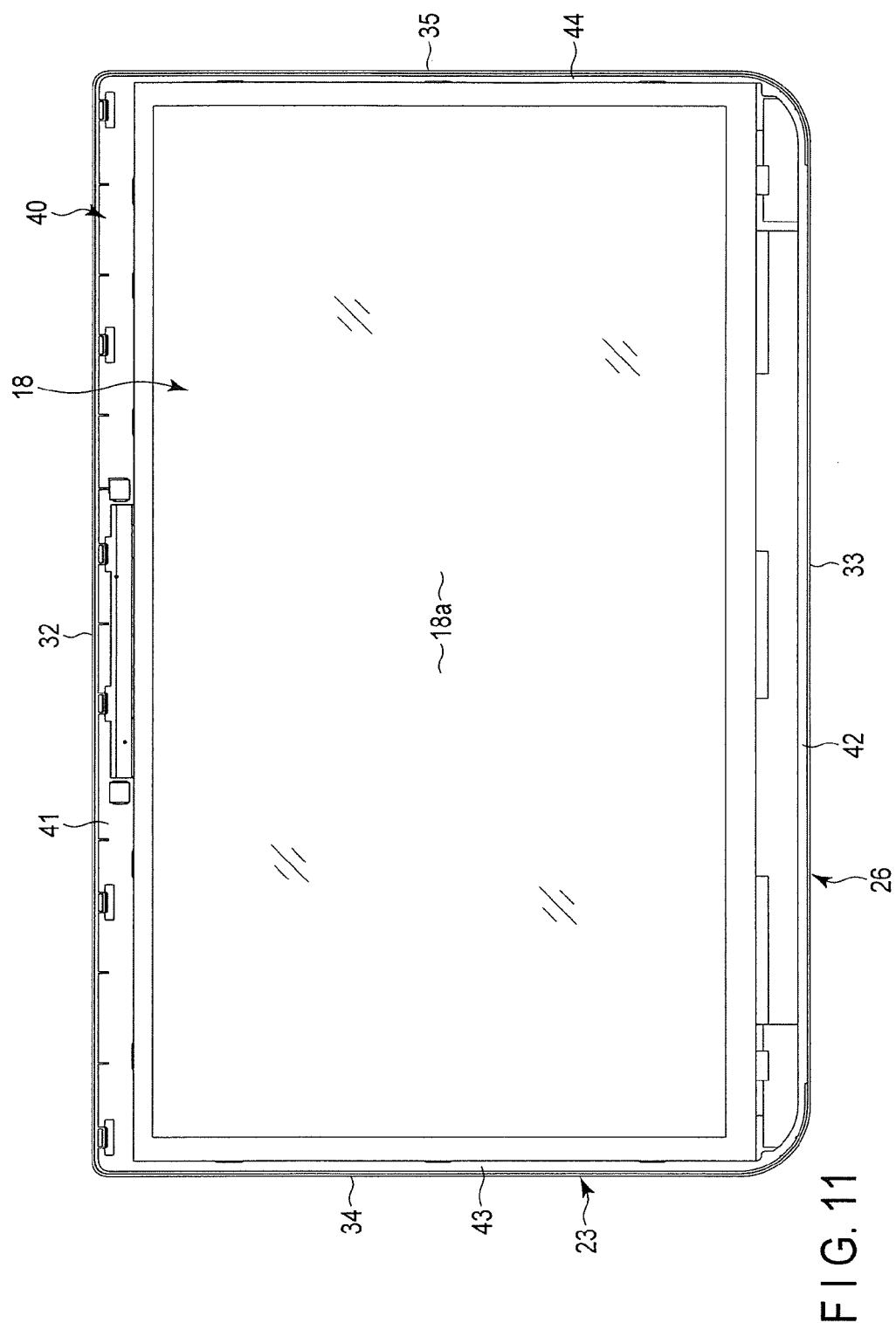
FIG. 11 is an exemplary plan view showing an attachment state of a display device illustrated in FIG. 2.

FIG. 11 shows that the display device 18 is accommodated in the housing 3. As the accumulation portion 63 is provided in the inner circumferential frame of the supporting member 40, the adhesive agent 51 is difficult to leak into the inside of the supporting member 40. Therefore, a clearance between the display device 18 and the supporting member 40 can be diminished.

According to the electronic apparatus 1 having such a structure, miniaturization of the electronic apparatus 1 can be achieved.

In sum, the electronic apparatus 1 according to the present embodiment includes the first member (e.g., mask 25), the second member (e.g., cover 26) and the supporting member 40. The second member comprises the first portion 31 spaced apart from the first member, and the second portion 32 that inclines in the direction approaching the first member and is adjacent to the first member. The supporting member 40 is fixed to the inner surface 32*a* of the second portion 32 of the second member by the adhesive agent 51. The supporting member 40 comprises the rib 71 that comes in contact with the inner surface 32*a* of the second portion 32 at a position between the end 32*e* of the second portion 32 adjacent to the first member and the adhesive agent 51.

According to this structure, since the rib 71 is provided between the end of the supporting member 40 and the adhesive agent 51, the adhesive agent 51 is difficult to leak into the outside of the supporting member 40. Thus, a clearance between the outer circumferential frame of the supporting member 40 and the outer circumferential frame of the cover 26 can be small. In this manner, the electronic apparatus 1 can be downsized.

Moreover, by the contact of the rib 71 with the second portion 32 of the cover 26 which inclines with respect to the first portion 31, the location determination of the supporting member 40 in the X direction is set in addition to the Z direction. Therefore, it is possible to easily determine the position of the supporting member 40 with high accuracy. Thus, in the electronic apparatus 1, components can be readily mounted in high density with high precision. This contributes to further reduction in the size of the electronic apparatus 1.

In the present embodiment, in the mask 25, the first engaging portions 27 are provided. The cover 26 comprises the first portion 31 in which the display device 18 is located. The display device 18 is interposed between the first portion 31 and the mask 25. The cover 26 further comprises the second portion 32. The second portion 32 inclines in the direction approaching the mask 25 from the first portion 31 and is adjacent to the mask 25. The supporting member 40 is fixed to the inner surface 32*a* of the second portion 32 of the cover 26 by the adhesive agent 51, and comprises the second engaging portions 52 that engage with the first engaging portions 27. The supporting member 40 comprises the first projection 61. The first projection 61 comes in contact with the inner surface 32*a* of the second portion 32 between the end 32*e* of the second portion 32 adjacent to the mask 25 and the adhesive agent 51, and extends along the end 32*e* of the second portion 32.

According to this structure, the cover 26 does not need to comprise an engaging structure that engages with each of the first engaging portions 27. Thus, the configuration of the cover 26 can be simplified. This contributes to the reduction in the size (e.g., thickness) and the costs of the electronic apparatus 1. Moreover, according to the above structure, through the position determination of the supporting member 40 with high accuracy, the position of each second engaging portion 52 can be determined with high precision. This diminishes backlash between each first engaging portion 27 and each second engaging portion 52, etc., and contributes to the production of the electronic apparatus 1 with high quality.

In the present embodiment, the display device 18 comprises the display screen 18*a*. The first projection 61 which is a part of the rib 71 comes in contact with the inner surface 32*a* of the second portion 32 in the thickness direction of the display device 18. Further, the first projection 61 comes in contact with the inner surface 32*a* of the second portion 32 in a direction substantially parallel with the display screen 18*a*. According to this structure, the position determination of the supporting member 40 can be performed in the thickness direction of the display device 18 and the direction substantially parallel with the display screen 18*a*.

In the present embodiment, the cover 26 comprises the third portion 33. The third portion 33 is positioned on the side opposite to the second portion 32, extends in the direction crossing the first portion 31, and is adjacent to the mask 25. The supporting member 40 is fixed to the inner surface 33*a* of the third portion 33 of the cover 26 by the adhesive agent 51. The supporting member 40 comprises the second projection 65. The second projection 65 touches the inner surface 33*a* of the third portion 33 at a position between the end 33*e* of the third portion 33 adjacent to the mask 25 and the adhesive agent 51, and extends along the end 33*e* of the third portion 33. According to this structure, the position determination of the supporting member 40 can be performed with higher accuracy by the first projection 61 and the second projection 65.

In the present embodiment, the first projection 61 comes in contact with the inner surface 32*a* of the second portion 32 of the cover 26 in the first direction D1. The second projection 65 touches the inner surface 33*a* of the third portion 33 of the cover 26 in the second direction D2 that is different from the first direction D1. According to this structure, the position determination of the supporting member 40 can be conducted with higher precision.

In the present embodiment, the supporting member 40 is a frame shape along the outer shape of the cover 26. In the outer circumferential frame of the supporting member 40, the rib 71 including the first projection 61 and the second projection 65 is provided. The rib 71 is provided substantially in the whole circumference of the outer circumferential frame of the supporting member 40. This structure enables the rib 71 having a frame shape to be provided substantially in the whole circumference of the inner surface of the cover 26. Thus, the position determination of the supporting member 40 can be performed with higher accuracy. Further, as the rib 71 is applied to the inclined surface portion of the cover 26 substantially in the entire area of the outer circumferential edge of the cover 26, the position determination in the X direction, the Y direction and the Z direction can be performed.

In the present embodiment, the inner circumferential frame of the supporting member 40 comprises the accumulation portion 63. The accumulation portion 63 has the surface 63a inclining in the direction away from the inner surface of the cover 26 and can accommodate a part of the adhesive agent 51. According to this structure, the adhesive agent 51 is difficult to leak into the inside of the supporting member 40. Therefore, it is possible to diminish the clearance between the inner circumferential frame of the supporting member 40 and the member (e.g., display device 18) located inside the supporting member 40. Thus, the electronic apparatus 1 can be further downsized.

For example, in a structure in which an escape hole for an adhesive agent is provided in the supporting member 40, the bonded area is reduced by the area in which the escape hole is provided. Therefore, it is difficult to miniaturize the supporting member 40. On the other hand, in the present embodiment, the gap between the inclined surface 63a of the accumulation portion 63 and the inner surface of the cover 26 is fixed by the adhesive agent 51. According to this structure, even if the supporting member 40 has been downsized, the bonded area can be readily and sufficiently ensured. Therefore, it is easy to reduce the size of the supporting member 40. This contributes to the miniaturization of the electronic apparatus 1.

In the present embodiment, the accumulation portion 63 extends along the inner circumferential frame of the supporting member 40. The accumulation portion 63 is provided, for example, substantially in the whole circumference of the inner circumferential frame of the supporting member 40. According to this structure, the adhesive agent 51 is more difficult to leak into the inside of the supporting member 40, and the electronic apparatus 1 can be further downsized.

The above-described embodiments are not limited. In the implementation stage, the structural elements may be modified without departing from the scope. Various modifications can be realized by appropriately combining the structural elements disclosed in the embodiments. For instance, some of the disclosed structural elements may be deleted. Some structural elements of different embodiments may be combined appropriately.

For example, the adhesive agent 51 does not need to be provided substantially in the whole area of the supporting member 40. The adhesive agent 51 does not need to be provided in, for example, a portion which is distant from the proximity of the second engaging portions 52. The rib 71 and the accumulation portion 63 may be omitted in, for example, an area in which the adhesive agent 51 is not provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a display device;
a mask comprising an opening and a first engaging portion, the opening exposing the display device;
a cover comprising a first portion and a second portion, the display device located between the mask and the first portion, the second portion inclining toward the mask and comprising an end adjacent to the mask; and
a supporting member attached to an inner surface of the second portion of the cover by an adhesive agent, the supporting member comprising a second engaging portion and a first projection, the second engaging portion configured to engage with the first engaging portion, the first projection contacting with the inner surface of the second portion between the end of the second portion and the adhesive agent and extending along the end of the second portion.

2. The electronic apparatus of claim 1, wherein
the display device comprises a display screen, and
the first projection contacts with the inner surface of the second portion in each of a direction substantially parallel with the display screen and a direction crossing an inner surface of the first portion.

3. The electronic apparatus of claim 1, wherein
the cover comprises a third portion opposite the second portion, the third portion extending in a direction crossing the first portion and comprising an end adjacent to the mask, and
the supporting member is attached to an inner surface of the third portion of the cover by the adhesive agent, the supporting member comprising a second projection contacting with the inner surface of the third potion between the end of the third portion and the adhesive agent and extending along the end of the third portion.

4. The electronic apparatus of claim 3, wherein
the first projection contacts with the inner surface of the second portion of the cover in a first direction, and the second projection contacts with the inner surface of the third portion of the cover in a second direction different from the first direction.

5. The electronic apparatus of claim 3, wherein
the supporting member is a frame shape along an outer shape of the cover, and
an outer circumferential frame of the supporting member comprises a rib comprising the first projection and the second projection.

6. The electronic apparatus of claim 5, wherein
the rib is provided substantially in a whole circumference of an outer circumferential frame of the supporting member.

7. The electronic apparatus of claim 5, wherein
an inner circumferential frame of the supporting member comprises an accumulation portion, the accumulation portion comprising a surface inclining in a direction away from an inner surface of the cover and configured to accommodate a part of the adhesive agent.

8. The electronic apparatus of claim 7, wherein the accumulation portion extends along an inner circumferential frame of the supporting member.

9. The electronic apparatus of claim 7, wherein the accumulation portion extends substantially in a whole circumference of an inner circumferential frame of the supporting member.

* * * * *